(12) United States Patent
Idemura et al.

(10) Patent No.: US 7,662,878 B2
(45) Date of Patent: Feb. 16, 2010

(54) AQUEOUS PIGMENT DISPERSION AND INK COMPOSITION FOR INKJET RECORDING

(75) Inventors: Satoshi Idemura, Saitama (JP); Tomoyuki Uezono, Ageo (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 38 days.

(21) Appl. No.: 11/814,964

(22) PCT Filed: Jan. 30, 2006

(86) PCT No.: PCT/JP2006/301456
§ 371 (c)(1),
(2), (4) Date: Jul. 27, 2007

(87) PCT Pub. No.: WO2006/080497
PCT Pub. Date: Aug. 3, 2006

(65) Prior Publication Data
US 2009/0018245 A1 Jan. 15, 2009

(30) Foreign Application Priority Data
Jan. 31, 2005 (JP) .............................. 2005-023207

(51) Int. Cl.
*C08K 5/07* (2006.01)
*C08G 18/66* (2006.01)
(52) U.S. Cl. ...................... 524/357; 524/356
(58) Field of Classification Search .................. 524/357
See application file for complete search history.

(56) References Cited

U.S. PATENT DOCUMENTS

| 6,824,262 B2 * | 11/2004 | Kubota et al. ............... 347/100 |
| 7,368,148 B2 | 5/2008 | Nakamura et al. |
| 2005/0193906 A1 | 9/2005 | Nakamura et al. |

FOREIGN PATENT DOCUMENTS

| EP | 1555549 A2 | 7/2005 |
| JP | 8-5831 A | 1/1996 |
| JP | 8-271715 A | 10/1996 |
| JP | 10-115709 A | 5/1998 |
| JP | 2000-219749 A | 8/2000 |
| JP | 2001-108819 A | 4/2001 |
| JP | 2001-158864 A | 6/2001 |
| JP | 2004-90596 A | 3/2004 |
| JP | 2004-276397 A | 10/2004 |
| JP | 2004-302086 A | 10/2004 |
| JP | 2005-48014 A | 2/2005 |
| JP | 8-183920 A | 7/2007 |

OTHER PUBLICATIONS

Translation of JP 08-183920, Jul. 1996.*
Translation of JP 2000-219749, Aug. 2000.*
European Search Report dated May 30, 2008, issued in corresponding European Patent Application No. 06712599.7.
International Search Report of PCT/JP2006/301456, date of mailing Apr. 18, 2006.

* cited by examiner

*Primary Examiner*—Ling-Siu Choi
*Assistant Examiner*—Hui Chin
(74) *Attorney, Agent, or Firm*—Westerman, Hattori, Daniels & Adrian, LLP

(57) ABSTRACT

The present invention is to provide an orange ink composition for inkjet recording high in color saturation and gloss, while having long storage stability and jet stability, and also to provide an aqueous pigment dispersion mainly composing the ink composition. The aqueous pigment dispersion which contains a styrene-acrylic acid copolymer containing 60% by mass or more of styrene-based monomer units with respect to total monomer components and having an acid value of 130 to 200 and a weight-average molecular weight of 6,000 to 40,000, an alkali metal hydroxide, a wetting agent and C. I. Pigment Red 168 is excellent in storage stability and high in gloss. Further, an ink composition for inkjet recording mainly composing the aqueous pigment dispersion reflects an excellent dispersibility of the aqueous pigment dispersion, thereby having a favorable jettability and excellent light fastness.

12 Claims, No Drawings

AQUEOUS PIGMENT DISPERSION AND INK COMPOSITION FOR INKJET RECORDING

TECHNICAL FIELD

The present invention relates to an aqueous pigment dispersion which uses an orange pigment and also to an ink composition for inkjet recording which uses the pigment dispersion.

BACKGROUND ART

Aqueous ink is able to reduce the risk of fire or toxicity such as mutagenicity in association with use of oil-based ink, thereby finding wide use for inkjet recordings other than industrial uses.

Such aqueous ink includes dyes as coloring agents, which are high in stability, less frequent in nozzle clogging, excellent in color developing properties and able to provide a high-quality printing. However, there is a problem that dyes are inferior in water resistance and light fastness of an image.

In order to solve this problem, an attempt has been actively made to shift coloring agents from dyes to pigments. Pigment ink is expected to be excellent in water resistance and light fastness but has problems with nozzle clogging associated with coagulation and sedimentation of pigments. Therefore, such a method has been studied that a pigment processed into fine particles is dispersed into an aqueous medium by using a polymer dispersant.

In order for the ink containing pigments as coloring agents to be used to provide a multi-color printing, all four ink colors of black, cyan, magenta and yellow need to satisfy not only color developing properties but also excellent dispersibility, jettability and storage stability. Therefore, a detailed examination has been made for the selection of optimal pigments according to respective colors, the selection of polymer dispersants capable of dispersing these pigments favorably and stably as well as a method for producing aqueous pigment dispersions using these pigments and dispersants. However, in addition to the variety of various types of pigments corresponding to the respective colors, the details of an optimal dispersion method to be used differ according to each pigment, and optimal ink for inkjet recording is not necessarily provided for all the colors.

In recent years, such an attempt has been made that ink having colors of red, orange, green and violet, in addition to four ink colors of black, cyan, magenta and yellow, is used to improve the color reproducibility of a printed image. Further, such pigment ink for inkjet recording has been demanded for a greater number of colors that is able to satisfy the dispersion stability and that is also excellent in color developing properties and gloss.

Three colors of orange, green and violet are in combination with the above-described basic four colors by using a pigment with a favorable color developing area, thereby making it possible to form an image which is remarkably expansive in the color gamut and excellent in color reproducibility.

However, it is not easy to select a pigment which retains an ideal color developing area and also has the above-described inkjet appropriateness and also provide ink for inkjet recording which has excellent dispersibility, jettability and storage stability.

Since, for example, the color of orange is used in R (red) which is one of the three primary colors of light, many pigments are exemplified such as C. I. Pigment Red 166, Pigment Red 168, Pigment Red 177, Pigment Red 224, Pigment Red 254, Pigment Orange 36 and Pigment Orange 43, as pigments for paste production which applied to color filter (refer to Patent Document 1).

These orange pigments are mainly used as printing ink for color filters and in most cases not expected for use as inkjet recordings. Therefore, no consideration has substantially been so far made for realizing excellent dispersibility and jettability when these pigments are made into an aqueous pigment dispersion with low viscosity. However, in recent years, an attempt has been made for forming a color filter by an inkjet recording method. Attempts have been partially made where these pigments are applied to an inkjet recording method for forming color filters in which the above pigments are used.

However, as compared with printing of color filters made continuously by using a special machine at a plant where temperatures are controlled, an ordinary printing manufactured by using a general-use inkjet printer under conditions substantially free of maintenance in response to irregular and occasional printing requests in a wide temperature range needs ink for inkjet recording which is high in dispersion stability and long storage stability.

Since the above orange pigments have been actually used in color filters, they are often described in known documents as pigments similarly used as ink for inkjet recording. However, consideration has only been scarcely made for ink for inkjet recording in which orange pigments are used, unlike the basic four colors used in an ordinary inkjet recording. Therefore, despite the fact that orange color ink for inkjet recording is expected to provide a jettability, dispersibility and storage stability which are similar to those of the basic four colors, the orange color ink for inkjet recording is actually not provided as that having satisfactory ink characteristics.

Further, in recent years, there is a growing demand for prolonged stability of color development of a printed image. Still further, in association with increased chances that printed materials for industry are used outdoors, there is also a demand for pigment ink for inkjet recording which is excellent in light fastness as well. Where the ink is expected to be used as ink for thermal jet recording, it is considered essentially necessary to provide the storage stability at further elevated temperatures which will result in at greater demand for the ink.

In order to satisfy the above conditions, a detailed examination is required for a polymer dispersant to be combined, an optimal formulation when the dispersant is used, and a production method using the formulation. However, such consideration has hardly been made so far for high-performance ink for inkjet recording using these orange pigments.

In particular, C. I. Pigment Red 168 is hard and difficult in crushing. Since this pigment contains bromine, it is high in specific gravity, easy in sedimentation in solution and quite difficult in retaining dispersion in low-viscosity ink such as ink for inkjet recording. Further, the pigment easily causes coagulation in such a manner that the direction of the pigments is uniform due to the needle shape of pigment particles. Therefore, in view of obtaining a favorable dispersion, it is very important to adsorb a polymer dispersant on the surface of the pigment and stabilize the dispersion with steric hindrances. Further, although it is necessary to make small the particle size of a pigment for the purpose of realizing a high gloss, a pigment having a needle shape such as the Pigment Red 168 is substantially restricted in decreasing the particle size in a longitudinal direction, and the gloss may be greatly decreased where a favorable dispersion is not attained.

Among orange pigments, the Pigment Red 168 in particular is estimated to have the above-described difficulties in preparation of ink for inkjet, and additional consideration is expected to be required for imparting a favorable dispersibility. Thus, the pigment is hardly considered for use of ink for inkjet recording.

A production example has been disclosed in which the Pigment Red 168 is used to obtain an ink composition for inkjet recording which is less likely to cause coagulation by restricting the concentration of phosphorus in the pigment (refer to Patent Document 2). However, an object of this document is to prevent the coagulation, which is a common problem found in many pigments, an emphasis is given only to the concentration of phosphorous in the pigment, and no consideration is made for the selection of an optimal dispersant used in the Pigment Red 168. Further, no description is made for other important characteristics such as dispersibility, storage stability, and light fastness which are required for a pigment used in ink for inkjet recording.

Various considerations have been separately made for polymer dispersants which are to be combined with pigments. However, there are provided no specific guidelines for selecting dispersants as particularly appropriate resin compositions with respect to pigments developing an orange color including the Pigment Red 168 among many polymer dispersants. For example, one of the documents referring to a polymer dispersant used in ink for inkjet recording has disclosed a method for producing an aqueous pigment dispersion used as ink for inkjet having a step where a styrene/acrylic resin of 50 to 90% by mass of a styrene-based monomer unit and an acrylic acid monomer unit or a methacrylic acid monomer unit with an acid value of 50 to 300, a pigment, a wetting agent and a basic compound are kneaded to prepare a colored and kneaded substance (refer to Patent Document 4). However, the above document does not specify a pigment which can preferably be combined in particular or does not disclose at all about which pigment selected from many known orange pigments can yield orange color ink for inkjet recording having excellent characteristics. In the first place, there are reported only a small number of cases in which orange pigments such as the Pigment Red 168 are used to actually prepare an aqueous pigment dispersion for inkjet recording. In particular, the Pigment Red 168 as special ink for forming a color filter has been described only in several documents (Patent Documents 5 to 8) and in Patent Document 3 in addition to Patent Document 2, among documents covering a method for preparing color filters. No consideration has been made for optimal formulations of aqueous pigment dispersions such as selection of polymer dispersants in these documents. Therefore, if these documents are referenced, it is impossible to prepare by using the C. I. Pigment Red 168 excellent in light fastness and color developing properties, an aqueous pigment dispersion excellent in dispersibility and jettability or favorable in long storage stability when used in a general-use inkjet printer.

Patent Document 1: Japanese Published Unexamined Patent Application No. Hei-10-115709

Patent Document 2: Japanese Published Unexamined Patent Application No. 2001-158864 (Embodiment 3)

Patent Document 3: Japanese Published Unexamined Patent Application No. 2001-108819

Patent Document 4: Japanese Published Unexamined Patent Application No. 2005-048014

Patent Document 5: Japanese Published Unexamined Patent Application No. Hei-08-271715

Patent Document 6: Japanese Published Unexamined Patent Application No. Hei-08-005831

Patent Document 7: Japanese Published Unexamined Patent Application No. 2004-090596

Patent Document 8: Japanese Published Unexamined Patent Application No. 2004-302086

DISCLOSURE OF INVENTION

An object of the present invention is to provide an orange ink composition for inkjet recording capable of realizing simultaneously excellent long storage stability, high gloss and light fastness of an printed image, expanding the color gamut of an inkjet recording method and improving the color reproducibility and an aqueous pigment dispersion used in producing the orange ink composition for inkjet recording.

Another object of the present invention is to provide a method for producing an aqueous pigment dispersion for inkjet recording having the above-described characteristics.

In view of the above situation, the applicant has diligently conducted research, and found that the above problem can be solved by an aqueous pigment dispersion mainly composing a specifically-structured orange pigment and a specifically-structured styrene-acrylic acid copolymer, leading to the present invention.

More specifically, the present invention is to provide an aqueous pigment dispersion which contains (a) an orange pigment, (b) a styrene-acrylic acid copolymer, (c) an alkali metal hydroxide, and (d) a wetting agent, in which (a) the orange pigment is C. I. Pigment Red 168 and (b) the styrene-acrylic acid copolymer contains 60% by mass or more of styrene-based monomer units and has an acid value of 130 to 200 and a weight-average molecular weight of 6,000 to 40,000.

Since an aqueous pigment dispersion of the present invention is made from the Pigment Red 168 excellent in light fastness and color developing properties in which a styrene-acrylic acid copolymer having a specific composition and characteristics is used as a dispersant, the pigment dispersion is very small in the initial dispersion particle size, excellent in dispersion stability, free of nozzle clogging and excellent in jettability. It is also excellent in storage stability when stored at high temperatures.

Further, the present invention is to provide an ink composition for inkjet recording mainly composing the aqueous pigment dispersion.

The ink composition for inkjet recording of the present invention is provided with favorable jettability and excellent storage stability and also capable of constituting an ink-set by being combined with another color ink composition for inkjet recording, thereby forming an image excellent in color reproducibility.

Still further, the present invention is to provide a method for producing an aqueous pigment dispersion having a step of dispersing a mixture containing (a) an orange pigment, (b) a styrene-acrylic acid copolymer, (c) an alkali metal hydroxide, (d) a wetting agent and (f) water, in which (a) the orange pigment is C. I. Pigment Red 168 and (b) the styrene-acrylic acid copolymer contains 60% by mass or more of styrene-based monomer units and has an acid value of 130 to 200 and a weight-average molecular weight of 6,000 to 40,000.

An aqueous pigment dispersion of the present invention is combined with the styrene-acrylic acid copolymer having the above-described specific monomer components, having the acid value and the molecular weight and the Pigment Red 168, thereby having an excellent dispersibility. Further, ink for inkjet recording mainly composing the aqueous pigment dispersion is excellent in storage stability, and an image formed by the ink is excellent in gloss and light fastness. The aqueous pigment dispersion is used together with other color ink for inkjet recording, thereby providing a multi-color printed image excellent in color reproducibility.

BEST MODE FOR CARRYING OUT THE INVENTION

The (a) pigment used in the present invention is C. I. Pigment Red 168, the chemical formula of which is an antanthrone-based pigment expressed by the following formula (1), having the chemical name of 4,10,dibromoanthanthrone.

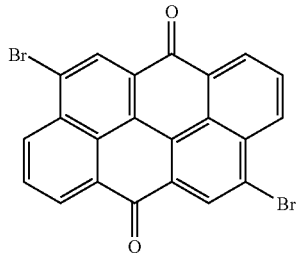

(1)

There is no particular restriction on the particle size of C. I. Pigment Red 168. It is, however, preferable that the average particle size obtained through an electron microscope is 200 nm or lower. Where the particle size exceeds 200 nm, there is a tendency that ink containing such particles decreases in jettability. The Pigment Red 168, which is high in specific gravity, is easy to sediment in liquid and difficult in attaining a stable dispersion. Since the pigment is usually formed in a needle shape, it is important to adsorb a resin on the surface and stabilize the dispersion due to steric hindrances.

In the present invention, (b) the styrene-acrylic acid copolymer used contains at least styrene, and both or one of acrylic acid and methacrylic acid as a constituent monomer, preferably containing all of styrene-acrylic acid and methacrylic acid. The above copolymer contains 60% by mass or more of styrene monomer in terms of constituent monomer composition ratio, preferably containing 90% by mass or less of styrene monomer. It is in particular preferable that the sum of styrene monomer units, acrylic acid monomer units and methacrylic acid monomer units is 95% by mass or more. The styrene-acrylic acid copolymer of the present invention contains styrene monomer units at high concentrations of as high as 60% by mass or more, the copolymer is able to adsorb favorably on the surface of a hydrophobic pigment, thereby favorably retaining the dispersibility of the pigment. The copolymer adsorbs strongly and in particular strongly adsorbs on the Pigment Red 168. The dispersibility can be retained even after a much longer storage of the Pigment Red 168 at high temperatures for a longer period of time, as compared with other pigments.

On the other hand, where styrene monomer units are less than 60% by mass, there is a tendency that the affinity of (b) a styrene-acrylic acid copolymer to (a) a pigment is insufficient and the dispersion stability is decreased. There is also a tendency that the recording characteristics of ordinary paper using the thus obtained ink composition for inkjet recording deteriorate to result in a decrease in image recording concentrations and water resistance. Where styrene monomer units exceed 90% by mass, there is a tendency that the solubility of (b) the styrene-acrylic acid copolymer to an aqueous medium is decreased to result in a decrease in dispersibility and stability of the pigment in an aqueous pigment dispersion. There is also a tendency that the printing stability is decreased when used in ink for inkjet recording.

The acid value of (b) a styrene-acrylic acid copolymer used in the aqueous pigment dispersion of the present invention is 130 to 200. Where the acid value is smaller than 130, there is a tendency that the hydrophilic property is lowered to decrease in dispersion stability of a pigment. On the other hand, where the acid value exceeds 200, there is a tendency that the pigment easily coagulates and the water resistance of printed matter in which an ink composition is used is decreased. The acid value is preferably in a range from 145 to 195 and more preferably from 155 to 190.

When (b) the styrene-acrylic acid copolymer is used together with acrylic acid and methacrylic acid as its constituent monomer, random copolymerization is increased upon resin synthesis to effectively improve the solubility of a resin, which is preferable.

Monomer units which can polymerize with monomers other than styrene-acrylic acid and methacrylic acid may be contained at less than 5% by mass in (b) styrene-acrylic acid copolymer. These monomers include, for example, styrene derivatives such as an α-methyl styrene and vinyl toluene; (meta)acrylic esters such as a methyl(meta)acrylate, ethyl (meta)acrylate, n-propyl(meta)acrylate, isopropyl(meta) acrylate, n-butyl(meta)acrylate, sec-butyl(meta)acrylate, tert-butyl(meta)acrylate, 2-methylbutyl(meta)acrylate, 2-ethylbutyl(meta)acrylate, 3-methyl butyl(meta)acrylate, 1,3-dimethylbutyl(meta)acrylate, pentyl(meta)acrylate, hexyl(meta)acrylate, 2-ethylhexyl(meta)acrylate, heptyl (meta)acrylate, octyl(meta)acrylate and nonyl(meta)acrylate; (meta)acrylic ester derivatives such as a 2-ethoxylethyl acrylate, 3-ethoxypropyl acrylate, 2-etohoxybutyl acrylate, 3-ethoxybutyl acrylate, dimethylaminoethyl(meta)acrylate, hydroxyethyl (meta)acrylate, hydroxy propyl(meta)acrylate, hydroxyl butyl(meta)acrylate, ethyl α-(hydroxymethyl)acrylate, methyl-α-(hydroxymethyl)acrylate; (meta)acrylic acid aryl esters and (meta)acrylic acid aralkyl esters such as a phenyl (meta)acrylate, benzyl (meta)acrylate, phenyl ethyl (meta)acrylate; mono(meta)acrylate esters of polyhydric alcohol and polyhydric phenol such as a diethyleneglycol, triethyleneglycol, polyethyleneglycol, glycerin and bisphenol A; and maleic dialkyl esters such as a dimethyl maleate and diethyl maleate. One or more than two types of these monomers may be added as a monomer unit.

The weight-average molecular weight of (b) the styrene-acrylic acid copolymer used in the present invention is in a range from 6,000 to 40,000. The weight-average molecular weight is preferably in a range from 7,500 to 30,000 and more preferably from 7,500 to 12,000. Where the weight-average molecular weight is less than 6,000, (a) the pigment can be easily processed into small particles on initial dispersion but the dispersion tends to be decreased in long storage stability. Further, the pigment may coagulate to result in sedimentation.

Where the weight-average molecular weight of (b) the styrene-acrylic acid copolymer exceeds 40,000, there is a tendency that ink for inkjet recording prepared from the thus obtained aqueous pigment dispersion is increased in viscosity to deteriorate the jet stability of ink.

In the present invention, (b) the styrene-acrylic acid copolymer used may be any of random copolymers, block copolymers or graft copolymers. The graft copolymers include, for example, a graft polymer in which a copolymer with a non-ionic monomer polymerizable with polystyrene or styrene and with styrene is given as a stem or a branch, and a copolymer with other monomers containing an acrylic acid, methacrylic acid and styrene is given as a branch or a stem.

And (b) the styrene-acrylic acid copolymer may be a mixture of the above-described copolymer and the random copolymer.

In an aqueous pigment dispersion of the present invention, (b) the styrene-acrylic acid copolymer is preferably contained in 10 to 50 mass parts with respect to 100 mass parts of (a) the pigment and more preferably in 20 to 40 mass parts. Where the content of (b) the styrene-acrylic acid copolymer is less than 10 mass parts, there is a tendency that the aqueous pigment dispersion is decreased in dispersion stability and the abrasion resistance is decreased when the aqueous pigment dispersion is used to prepare ink for inkjet recording. Where the content exceeds 50 mass parts, there is a tendency that ink for inkjet recording is increased in viscosity.

In the present invention, (c) the alkali metal hydroxide used includes a sodium hydroxide, potassium hydroxide and lithium hydroxide, and potassium hydroxide is in particular preferable. Further, (c) the alkali metal hydroxide is preferably added in a range from 80% to 120% of the neutralization rate on the basis of the acid value of (b) the styrene-acrylic acid copolymer.

It is preferable to give the neutralization rate of 80% or more in view of improving the dispersion rate in an aqueous medium and attaining the dispersion stability and the storage stability. Further, it is preferable to add (c) the alkali metal hydroxide at 120% or less in view of preventing gelatinization when being stored for a long period of time and also in view of retaining the water resistance of a printed matter prepared by using an ink composition.

It is noted that in the present invention, the neutralization rate is a value which indicates a quantity at which alkali metal hydroxide is blended with respect to a quantity which needs to neutralize all carboxyl groups in the styrene-acrylic acid copolymer in terms of percentage (fold). The rate is calculated by the following formula.

Neutralization index (%)=((mass (g) of alkali metal hydroxide×56×1000)/(resin acid value×equivalence of alkali metal hydroxide×quantity of resin (g))×100    (Formula 1)

In the present invention, (d) the wetting agent used includes any commonly used wetting agents, for example, polyols such as a glycerin, ethyleneglycol, diethyleneglycol, triethyleneglycol, teraethyleneglycol, polyethyleneglycol, propyleneglycol, dipropyleneglycol, polypropyleneglycol, 1,3-propanediol, 1,4-butanediol, 1,5-pentane diol, 1,6-hexanediol, 1,2,6-hexanetriol, trimethylolpropane, penta-erythritol; lactams such as a 2-pyrrolidone, N-methyl-2-pyrrolidone, and ε-caprolactam; and a 1,3-dimethylimidazolidine.

The content of (d) a wetting agent in the aqueous pigment dispersion of the present invention is preferably in a range from 3 to 50% by mass and more preferably from 5 to 40% by mass. Where the content is less than 3% by mass, there is a tendency that the effect of preventing drying is insufficient. Where the content exceeds 50% by mass, there is a tendency that the dispersion is decreased in dispersion stability.

In the present invention, (e) a dispersion assistant agent is preferably triethanolamine. The triethanolamine binds to the carboxyl group of (b) the styrene-acrylic acid copolymer and also improves the adsorption of (b) the styrene-acrylic acid copolymer on Pigment Red 168. Therefore, the Pigment Red 168 is more strongly covered with (b) the styrene-acrylic acid copolymer. As with alkali metal hydroxide, triethanolamine binds to the carboxyl group of (b) the styrene-acrylic acid copolymer to neutralize the copolymer. Although it may be finally contained in an ink composition in isolation, triethanolamine influences the jettability and storage stability of ink only to a negligible extent, which is in particular favorable as a dispersion assistant agent.

Triethanolamine is preferably added to the Pigment Red 168 in a range from 1 to 10% by mass and more preferably from 3 to 7% by mass.

A method for preparing the aqueous pigment dispersion of the present invention is a method for producing the aqueous pigment dispersion having a step of giving dispersion processing to a mixture of (a) an orange pigment, (b) a styrene-acrylic acid copolymer, (c) an alkali metal hydroxide, (d) a wetting agent and (f) water, in which (a) the orange pigment is Pigment Red 168, (b) the styrene-acrylic acid copolymer contains 60% by mass or more of styrene monomer units and has an acid value of 130 to 200 and a weight-average molecular weight of 6,000 to 40,000.

More specifically, the following method can be adopted.

(1) A method for preparing the aqueous pigment dispersion by adding (a) a pigment to an aqueous medium composed of (b) a styrene-acrylic acid copolymer, (c) an alkali metal hydroxide, (d) a wetting agent and water, and dispersing (a) the pigment in the aqueous medium by use of an agitation/dispersion device.

(2) A method for preparing the aqueous pigment dispersion by use of an agitation/dispersion device by kneading (a) a pigment, (b) a styrene-acrylic acid copolymer and an organic solvent, if necessary, by use of a kneader such as a two-roll mill, a Henschel mixer or a planetary mill, adding the thus obtained kneaded substance to be dispersed to an aqueous medium containing water, (c) an alkali metal hydroxide and (d) a wetting agent. It is noted that (c) the alkali metal hydroxide and (d) the wetting agent are added, if necessary, when kneading.

Of the above-described methods for producing the aqueous pigment dispersion, the method of (2) is more preferable in terms of the dispersibility when ink for inkjet recording is prepared and the storage stability at high temperatures in particular, most preferable is a method for producing the aqueous pigment dispersion having a kneading step of kneading a mixture containing (a) an orange pigment, (b) a styrene-acrylic acid copolymer, (c) an alkali metal hydroxide and (d) a wetting agent to obtain a solid colored and kneaded substance and a dispersion step of dispersing the solid colored and kneaded substance into an aqueous medium, in which (a) the orange pigment is Pigment Red 168, (b) the styrene-acrylic acid copolymer contains 60% by mass or more of styrene-based monomer units and has an acid value of 130 to 200 and a weight-average molecular weight of 6,000 to 40,000.

Since a styrene-acrylic acid copolymer used in the present invention can, in particular, easily adsorb in particular strongly to the surface of the Pigment Red 168, it is possible to produce an aqueous pigment dispersion excellent in dispersibility even by the above production method (1) without using the kneading step. It is also possible to prepare ink for inkjet recording remarkably excellent in long storage stability at high temperatures by using the aqueous pigment dispersion.

However, in order to cover the surface of a pigment more effectively and more strongly by using a smaller quantity of resin, it is preferable to employ a production method having a kneading step of kneading a mixture containing a styrene-acrylic acid copolymer, Pigment Red 168 and alkali metal hydroxide to prepare a colored and kneaded substance and a dispersion step of dispersing the colored and kneaded substance into an aqueous medium. This production method is employed to produce an aqueous pigment dispersion, by which an ink composition for inkjet recording which contains the aqueous pigment dispersion as a major component is further improved in storage stability at high temperatures and the styrene-acrylic acid copolymer is decreased which is dispersed or dissolved into the ink composition in isolation from the pigment. As a result, it is less likely to have a discharging failure due to ink clogging resulting from sedimentation of the copolymer on the inner wall of the nozzle.

It is preferable that the aqueous pigment dispersion of the present invention contains triethanolamine. A method for producing the aqueous pigment dispersion is preferably such that triethanolamine can be contained in a mixture when being dispersed or agitated. However, a method for producing the aqueous pigment dispersion having a kneading step is preferably such that triethanolamine can be contained in a mixture in the kneading step to conduct the kneading step, a colored and kneaded substance is prepared, and the colored and kneaded substance is thereafter dispersed in an aqueous medium.

Hereinafter, a description is given for a production method having a particularly favorable kneading step with respect to each of the steps.

(a) Kneading Step

In the kneading step of the present invention, kneaded is a mixture of Pigment Red 168, a styrene-acrylic acid copolymer which contains 60% by mass or more of styrene monomer units and has an acid value of 130 to 200 and a weight-average molecular weight of 6,000 to 40,000, an alkali metal hydroxide, and a wetting agent, if necessary.

In the kneading step, the styrene-acrylic acid copolymer is increased in dispersibility by carboxyl groups in the copolymer being neutralized by the alkali metal hydroxide. Further, the copolymer is swollen by the wetting agent and softened in the surface to form one mass of a mixture together with the Pigment Red 168. Since the mixture is a solid at ordinary temperatures but exhibits a remarkably strong viscoelasticity at mixing temperatures of 50° C. to 90° C., it is possible to give a great shear to the mixture when kneading, by which the Pigment Red 168 is crushed to fine particles and the surfaces of the particles are covered by the styrene-acrylic acid copolymer.

In the above-described kneading step, since the styrene-acrylic acid copolymer is kept swollen by addition of the alkali metal hydroxide and the wetting agent, it is possible to soften the copolymer at a temperature much lower than the glass transition temperature. Kneading temperature (Mt) can be appropriately adjusted according to temperature characteristics of the styrene-acrylic acid copolymer so as to perform kneading under high shear conditions. It is, however, preferable that kneading is performed at a temperature range in which the kneading temperature (Mt) and the glass transition temperature (Tg) of the copolymer satisfy the following formula.

$$Tg-50 \leq Mt \leq Tg$$

The kneading is performed at a kneading temperature which satisfies the above formula, for which there is no chance that the copolymer is melted during kneading to result in a decrease in kneading viscosity, and thereby a reduction in shear, thus causing an insufficient kneading. Further, since the kneading is performed at a low temperature, liquid components are volatilized to a less extent, and a colored and kneaded substance after completion of the kneading step is less likely to increase in the solid content ratio. Further, the kneading is performed at a kneading temperature (Mt) at which a difference in temperature from (Tg) is 50° C. or lower, thereby, making it possible to perform quite effectively the kneading step after a resin and a pigment are integrated at an initial stage of the kneading. As described above, a kneaded substance after completion of the kneading which is produced through the kneading step at a low temperature largely contains a liquid content, in the subsequent dispersion step, Pigment Red 168, which is made into fine particles and encapsulated through the kneading step is quite easily dispersed into aqueous medium. Therefore, the copolymer which once adsorbs to the pigment to cover the surface thereof is less likely to be detached in the subsequent steps, and the thus adsorbed copolymer prevents coagulation of the Pigment Red 168 dispersed into the aqueous medium, thereby improving the dispersion stability.

In a method for producing the aqueous pigment dispersion of the present invention, it is preferable to use triethanolamine at the same time as a dispersion assistant agent in view of improving the dispersion stability, and it is in particular preferable to add triethanolamine to a mixture at the kneading step.

In the kneading step of the method for producing the aqueous pigment dispersion of the present invention, when a wetting agent is used at the same time, a styrene-based resin is kept swollen in the presence of alkali metal hydroxide and the wetting agent and softened. There is no need of adding a highly soluble solvent for dissolving the resin or performing a step for removing the solvent after the kneading, thereby realizing higher productivity.

As described above, it is possible to perform an effective kneading at a temperature lower than a glass transition temperature of the resin. Thus, a styrene-acrylic acid copolymer having a high Tg, which has been considered to be difficult to knead due to poor melting properties, can be used to produce an aqueous pigment dispersion. The above-described production method is employed, by which a styrene-acrylic acid copolymer having a high glass transition temperature can be kneaded at a low temperature and dispersed into an aqueous medium. Further, the method is employed in producing aqueous ink for inkjet recording which is used in inkjet recording based on a thermal jet system, thereby making it possible to easily produce an aqueous pigment dispersion excellent in heat stability.

In the kneading step of the present invention, roll kneaders such as a two-roll kneader and a three-roll kneader may be used.

However, in order to keep a solid content ratio during kneading in a constant value range and apply a stable shear to a colored and kneaded substance all the time, it is preferable to use a kneader which is of a sealed system or can be modified into a sealed system capable of suppressing volatilization of wetting agents and others. It is preferable to use a kneader which is equipped with an agitation tank, a lid of the agitation tank and mono-axial or multi-axial agitation blades. There is no particular restriction on the number of agitation blades, and it is preferable to have two or more agitation blades in view of obtaining a higher kneading performance.

The thus constituted kneader is used, after a colored and kneaded substance for an aqueous pigment dispersion is produced through the kneading step, the kneaded substance is not taken out but directly diluted in the same agitation tank, agitated as it is and subjected to an initial dispersion step, or the initial dispersion step is allowed to proceed to produce the aqueous pigment dispersion.

The above-described kneading devices include, for example, a Henschel mixer, a pressure kneader, a Bambari mixer, and a planetary mixer, and the planetary mixer is in particular favorable. In this instance, the planetary mixer is a planetary-type kneading device, the name of which is a common designation for kneading devices having agitation blades conducting sun-and-planet motions (hereinafter, referred to as a planetary mixer). In the production method of the present invention, since kneaded is a colored and kneaded substance with high solid concentrations containing a pigment and a resin, the viscosity varies widely depending on the kneading conditions of the kneaded substance. In particular, the planetary mixer is capable of operating over a wide range of viscosities from high to low ranges, so the kneading can be continuously performed by using one type of the device from the start of the kneading step to a transition stage into the dispersion step including a stage at which the kneaded substance is diluted after the needing step. Further, it is possible to easily add a wetting agent, carry out vacuum distillation and also easily adjust the viscosity and the shear when kneading.

As described above, dilution is made continuously from the kneading step, by which anionic hydrophilic groups in a styrene-acrylic acid copolymer which encapsulate the surface of a pigment can be gradually oriented toward an aqueous medium on the periphery, with the encapsulated state kept. It is, therefore, possible to provide a stable encapsulated state excellent in wetting property with respect to the aqueous medium.

In the production method of the present invention, in order to effectively knead Pigment Red 168 in a high viscosity range, with the swollen state of a styrene-acrylic acid copolymer kept, the solid content ratio of a mixture containing the styrene-acrylic acid copolymer and the Pigment Red 168 during kneading is preferably in a range from 50 to 80% by mass, and more preferably from 60 to 75% by mass. Where the solid content ratio is less than 50% by mass, the mixture is decreased in viscosity, kneading is not likely to sufficiently be carried out, and there is a tendency that the pigment is crushed insufficiently. On the other hand, the solid content is kept in a range from 50 to 80% by mass, by which the colored and kneaded substance during the kneading is kept appropriately high in viscosity, a shear applied from a kneader to a colored and kneaded substance is made great, thereby making it possible to pulverize the pigment in the colored and kneaded substance and cover the pigment with a resin at the same time. However, where the solid content ratio exceeds 80% by mass, the kneading is likely to be difficult even if heating is sufficiently given to soften the resin. There is a case where the colored and kneaded substance may have difficulty in being dispersed into an aqueous medium in the dispersion step.

Water may be added for kneading whenever necessary in the kneading step, in addition to a wetting agent.

In the kneading step of the production method of the present invention, when a solid-type colored and kneaded substance for inkjet ink is produced, the styrene-acrylic acid based copolymer is preferably used in a range of 10 to 50 mass parts with respect to a total of 100 mass parts of the Pigment Red 168 in the colored and kneaded substance, and more preferably from 20 to 40 mass parts. Where the styrene-acrylic acid copolymer is used at less than 10 mass parts, an aqueous pigment dispersion for inkjet ink is decreased in dispersion stability. Further when the ink composition for inkjet recording is prepared, there is a tendency that the abrasion resistance is decreased. On the other hand, where it is used at more than 50 mass parts, there is a tendency that the ink composition for inkjet recording is excessively increased in viscosity. Alkali metal hydroxide used in the kneading step is added as an aqueous solution of alkali metal hydroxide or an organic solvent solution. In this instance, the concentration of the aqueous solution of alkali metal hydroxide or the organic solvent solution is preferably in a range of 20% by mass to 50% by mass. Further, alcohol-based solvents such as a methanol, ethanol and isopropanol are preferably used as an organic solvent for dissolving the alkali metal hydroxide. Among these, it is preferable to use the aqueous solution of alkali metal hydroxide in the production method of the present invention.

Further, the alkali metal hydroxide is preferably in a quantity corresponding to 0.8 to 1.2 times a quantity necessary for neutralizing all carboxyl groups contained in the styrene-acrylic acid copolymer.

It is preferable that a wetting agent in the kneading step is added in a range of 40 to 80 mass parts with respect to 100 mass parts of the Pigment Red 168. Where the wetting agent is added in a quantity exceeding 80 mass parts, there is a tendency that the concentration of the solid content is decreased so as not to apply sufficient shear. Further, where the wetting agent is added in a quantity less than 40 mass parts, it is often difficult to melt solids with each other to provide a mixture suitable in kneading. There is also a tendency that a sufficient shear has difficulty in being provided. As a result, it is difficult to pulverize sufficiently the Pigment Red 168 and to allow the styrene-acrylic acid copolymer to adsorb to the surface thereof. There is also a tendency that a uniformly colored and kneaded substance for inkjet ink cannot be obtained.

Further, although the wetting agent differs in quantity depending on a resin to be used, in most cases, the wetting agent is preferably added to a mixture to be fed in a range of 10 to 50% by mass and more preferably from 20 to 40% by mass. Although the adding quantity differs depending on a wetting agent to be used, the wetting agent is preferably added in a range of ½ to 5 times the quantity of a resin, and more preferably in a range of 2 to 4.5 times the quantity of the resin. Where the wetting agent is added less than ½ times the quantity of the resin, the resin cannot be made swollen or softened in a state suitable for the kneading, and there is a possibility that the pigment may be decreased in dispersion stability. Further, where it is added more than 5 times, the mixture is decreased in viscosity during kneading to result in a failure of providing a sufficient kneading. Then, the pigment is decreased in dispersibility, and where aqueous ink for inkjet recording is prepared, there is a possibility that a poor image quality such as discharging failure may take place.

It is preferable that water or water and a wetting agent are added to the colored and kneaded substance prepared in the kneading step to provide a liquid mixture having the viscosity suitable in the dispersion step or a subsequent step. When the liquid mixture is prepared, it is preferable that water or water and a wetting agent are added to the colored and kneaded substance and agitation is conducted to gradually decrease the viscosity so as not to produce coagulated particles. A kneader equipped with an agitation tank and agitation blades is used, by which the colored and kneaded substance inside the agitation tank after completion of the kneading step can preferably be diluted as it is.

(b) Dispersion Step

The colored and kneaded substance for aqueous pigment dispersion, which has been completed for the kneading step, is a solid-form mixture at ordinary temperatures. In the dispersion step, after being diluted in an aqueous medium, the colored and kneaded substance for inkjet ink is subjected to dispersion processing, thereby producing an aqueous pigment dispersion for inkjet ink. The dispersion processing is conducted, by which coarse dispersion particles in the aqueous pigment dispersion for inkjet ink are further pulverized and the dispersion particles are made finer in particle size to improve the jet stability of ink compositions for inkjet recording and the ink characteristics such as printing concentrations. Further, in the production method of the present invention, the Pigment Red 168 contained in the colored and kneaded substance for inkjet ink in the dispersion step is already crushed in the kneading step and also covered by the styrene-acrylic acid copolymer, which is a dispersant. Therefore, the pigment is improved in dispersibility with respect to water. As a result, the Pigment Red 168 is easily dispersed into an aqueous medium for a shorter period of time and improved in production efficiency.

In the production method for the aqueous pigment dispersion of the present invention, triethanolamine may be used at the same time as a dispersion assistant agent for improving the dispersion stability.

The Pigment Red 168 is preferably added to an aqueous pigment dispersion for inkjet recording in a range of 5 to 25% by mass, and more preferably from 5 to 20% by mass. Where the Pigment Red 168 is added at less than 5% by mass, there is a tendency that ink compositions for inkjet recording prepared from the aqueous pigment dispersion for inkjet ink are insufficiently colored to result in a failure of attaining a sufficient image concentration. On the other hand, where it is added at more than 25% by mass, there is a tendency that the aqueous pigment dispersion for inkjet ink is decreased in dispersion stability of the pigment.

In the present invention, an aqueous medium is water or a substance mainly composed of water and a wetting agent. Wetting agents used herein are wetting agents similar to those used when kneading in the first step.

A dispersing device used in the dispersion step may include any known devices, for example, a paint shaker, ball mill, nano mill, attoritor, basket mill, sand mill, sand grinder, dinomill, disper mat, SC mill, spike mill and agitator mill in which a medium is used. Further, dispersing devices in which no medium is used include an ultrasonic homogenizer, high-pressure homogenizer, nanomizer, dissolver, disper and high-speed impeller disperser. The above-described device may be used solely or in combination of two or more kinds of them. Among these, the dispersing device in which a medium is used is preferable because of a higher dispersing capacity. The concentration may be adjusted, whenever necessary, by using an aqueous medium after dispersion.

Further, prior to the dispersion by the dispersing device (the principal dispersion), it is preferable that an aqueous medium is added to a colored and kneaded substance after completion of the kneading step, whenever necessary, depending on types of the dispersing device to be used, then, mixed, diluted and adjusted in advance to the viscosity appropriate for the treatment by the dispersing device (hereinafter, the substance, the viscosity of which is adjusted, is sometimes called a viscosity-adjusted substance). Where the kneading device having an agitation tank and agitation blades is used in the kneading step, the above viscosity adjustment may be made at the agitation tank before the colored and kneaded substance is taken out.

Where, for example, a sand mill is used, it is preferable that dilution is made so as to give 10 to 40% by mass in solid content concentration, the substance is transferred to the sand mill to conduct the dispersion after the viscosity is adjusted to several dozens to several hundreds mPa·sec.

An aqueous medium used in diluting the colored and kneaded substance may contain a wetting agent in view of preventing an aqueous pigment dispersion for inkjet ink from drying and the necessity for adjusting the viscosity when dispersion processing is carried out. The medium preferably contains the wetting agent in a range of 3 to 50% by mass in the aqueous pigment dispersion for inkjet ink, including a wetting agent contained in the colored and kneaded substance for inkjet ink, and more preferably from 5 to 40% by mass. Where the content is less than 3% by mass, there is a tendency of insufficient effects of preventing drying. Where the content exceeds 50% by mass, there is a tendency that the dispersion is decreased in dispersion stability. The wetting agent used when producing the colored and kneaded substance for inkjet ink may be the same as or different from the wetting agent used in the aqueous medium.

The aqueous pigment dispersion produced according to the method described in the above (1) or (2) may be subjected to centrifugation to remove coarse particles in the aqueous pigment dispersion.

Centrifugation is performed after the dispersion step is completed to adjust the dispersion, thereby making it possible to remove insufficiently dispersed coarse particles. The centrifugation can be performed, for example, under conditions of 10,000 G and the duration of three minutes or longer. There is provided a step of removing coarse particles, by which the pigment in an aqueous pigment dispersion is substantially inhibited for sedimentation after the removal step. In particular, the removal step is repeated, thereby making it possible to exhibit more conspicuous effects as described in embodiments of the present invention.

In particular, the Pigment Red 168 is hard in pigment, and requires a much longer time for crushing than other pigments by using an ordinary kneader or a dispersing device. Therefore, in view of production efficiency and prevention of occurrence of pigment fine particles resulting from a prolonged operation, the case is preferable where the dispersion step is appropriately performed in combination with the removal work of coarse particles by a centrifuge than the case where the kneader or the dispersing device is continuously operated until these coarse particles are completely disappeared.

An ink composition for inkjet recording of the present invention can be produced by using the aqueous pigment dispersion according to an ordinary method.

Where the aqueous pigment dispersion of the present invention is used to prepare the ink composition for inkjet recording, the processes of (i) through (iv) given below may be employed or additives may be used according to the purpose of improvement or adjustment.

(i) For the purpose of preventing drying of ink, (d) the previously described (d) wetting agent may be similarly added. It is preferable that (d) the wetting agent for preventing drying is added to the ink in a range of 3 to 50% by mass.

(ii) A penetrant may be added for the purpose of improving the penetration property into a medium to be recorded or adjusting the dot size on a recording medium.

The penetrant may include, for examples lower alcohols such as ethanol and isopropyl alcohol; ethylene oxide adducts of alkyl alcohols such as an ethyleneglycol hexylether and diethyleneglycol butylether; and propylene oxide adducts of alkyl alcohols such as a propyleneglycol propylether.

It is preferable that the penetrant is contained in the ink in a range of 0.01 to 10% by mass.

(iii) A surfactant may be added for adjusting ink characteristics such as surface tension. There is no particular restriction on surfactants that can be added for this purpose, and various types of anionic surfactants, nonionic surfactants, cationic surfactants and amphoteric surfactants may be used. Among these, anionic surfactants and nonionic surfactants are preferable.

The anionic surfactants include, for example, alkylbenzen sulfonate, alkylphenyl sulfonate, alkylnaphthalene sulfonate, higher fatty acid salt, sulfate ester of higher-fatty acid ester, sulfonate of higher-fatty acid ester, sulfate ester and sulfonate of higher alcohol ether, higher alkylsul of succinate, polyoxyethylene alkylether carboxylate, polyoxyethylene alkyl ether sulfate, alkyl phosphate, and polyoxyethylene alkyl ether phosphate. Their examples include a dodecylbenzen sulfonate, isopropylnaphthalene sulfonate, monobutylphenyl phenol monosulfonate, monobutylbiphenyl sulfonate, and dibutylphenyl phenol disulfonate.

The nonionic surfactants include, for example, a polyoxyethylene alkyl ether, polyoxyethylene alkylphenyl ether, polyoxyethylene fatty acid ester, sorbitan fatty acid ester, polyoxyethylene sorbitan fatty acid ester, polyoxyethylene sorbitol fatty acid ester, glycerine fatty acid ester, polyoxyethylene glycerine fatty acid ester, polyglycerine fatty acid ester, sucrose fatty acid ester, polyoxyethylene alkylamine, polyoxyethylene fatty amide, fatty acid alkylol amide, alkylalkanol amide, acetylene glycol, oxyethylene adduct of acetylene glycol, and polyethyleneglycol polypropyleneglycol block copolymer. Of these surfactants, preferable are a polyoxyethylene nonylphenyl ether, polyoxyethylene octylphenyl ether, polyoxyethylene dodecylphenyl ether, polyoxyethylene alkyl ether, polyoxyethylene fatty acid ester, sorbitan fatty acid ester, polyoxyethylene sorbitan fatty acid ester, fatty acid alkylol amide, acetylene glycol, oxyethylene adduct of acetylene glycol and polyethyleneglycol polypropyleneglycol block copolymer.

Other surfactants include silicone-based surfactants such as a polysiloxane oxyethylene adducts; fluorine-based surfactants such as a perfluoro alkyl carboxylate, perfluoro alkyl sulfonate, oxyethylene perfluoro alkyl ether; and bio-surfactants such as a spiculispole acid, rhamnolipid, and lysolecithin.

These surfactants may be used solely or in combination of two or more kinds of them.

Further, in view of stable dissolution of surfactants, the HLB is preferably in a range of 7 to 20.

Where a surfactant is added, a preferable quantity is in a range of 0.001 to 1% by mass with respect to a total mass of ink, a more preferable quantity is from 0.001 to 0.5% by mass, and a still more preferable quantity is from 0.01 to 0.2% by mass. Where the surfactant is added at less than 0.001% by mass, there is a tendency that the effect of the surfactant addition can hardly be obtained. Where it is added in excess of 1% by mass, problems such as a blurred image may often be found.

(iv) Antiseptic agents, viscosity modifiers, pH adjusters, chelating agents, plasticizers, antioxidants, ultraviolet absorbers, and the like may be added, whenever necessary.

A quantity of (a) pigment contained in the aqueous pigment dispersion of the present invention is preferably in a range of 5 to 25% by mass and more preferably from 5 to 20% by mass. Where (a) the pigment is contained in a quantity less than 5% by mass, there is a tendency that ink for inkjet recording prepared from the aqueous pigment dispersion of the present invention is not colored sufficiently to result in an insufficient concentration of images. On the other hand, where it is contained in a quantity more than 25% by mass, there is a tendency that the aqueous pigment dispersion is decreased in dispersion stability of the pigment.

A quantity of (a) the pigment contained in ink composition for inkjet recording prepared from the aqueous pigment dispersion of the present invention is preferably in a range of 2 to 10% by mass in order to satisfy the necessity for obtaining sufficient image concentration and secure dispersion stability of the pigment in the ink.

EMBODIMENT

Hereinafter, a more detailed description is given for the present invention with reference to embodiments.

In synthesis examples, embodiments and comparative examples given hereinafter, "parts" and "%" respectively denote "mass parts" and "% by mass."

Synthesis Example 1

100 parts of methyl ethyl ketone was placed into a reaction vessel equipped with an stirrer, a dropping device and a reflux device, and the inside of the reaction vessel was subject to nitrogen purge while agitating. The reaction vessel is heated, with nitrogen atmosphere being kept inside the vessel, and methyl ethyl ketone was in reflux. Thereafter, a mixture solution of 77 parts of styrene, 10 parts of acrylic acid, 13 parts of methacrylic acid, and 8 parts of a polymerization catalyst was dropped for two hours by a dropping device (manufactured by Wako Pure Chemical Industries Ltd./V-59). It is noted that the reaction system was heated at 80° C. from the halfway point of dropping.

After the completion of dropping, the reaction system was allowed to react at the same temperature continuously for another 25 hours. Further, halfway through the reaction, a polymerization catalyst was appropriately added, whenever necessary, while the consumption of raw materials was confirmed. After the completion of the reaction, the reaction system was allowed to stand for cooling, and methyl ethyl ketone was added thereto to obtain a solution of a styrene-acrylic acid copolymer (A-1) having anionic groups of 50% solid content concentration. The thus obtained styrene-acrylic acid copolymer (A-1) has 140 mgKOH/g of acid value, 107° C. of glass transition temperature (calculated value) and 7,600 of weight-average molecular weight.

It is noted that the weight-average molecular weight described in the present invention is a value measured by using the GPC (gel permeation chromatography) method, or a value obtained by converting to the molecular weight of polystyrene used as a reference substance. The measurement is made by using the devices under the conditions described below.

Feeding pump: LC-9A

System controller: SLC-6B

Automatic inkjetor: S1L-6B

Detector: RID-6A

Devices above are manufactured by Shimadzu Corporation

Data processing software: Sic480 II data station (manufactured by System Instruments Inc.)

Column: GL-R400 (guard column)+GL-R440+GL-R450+GL-R400M (manufactured by Hitachi Chemical Co., Ltd.)

Elution solvent: THF

Elution rate: 2 mL/min

Column temperature: 35° C.

Adjustment was made for types and amounts of monomers, and reaction conditions in accordance with the production method of Synthesis Example 1 to synthesize the following styrene-acrylic acid copolymer.

Synthesis Example 2

A styrene-acrylic acid copolymer (A-2) was synthesized, in which the ratio of monomer compositions was styrene/acrylic acid/methacrylic acid=77/10/13 (mass ratio), the weight-average molecular weight was 20000, the acid value was 151 mgKOH/g, and the glass transition temperature was 107° C.

Synthesis Example 3

A styrene-acrylic acid copolymer (A-3) was synthesized, in which the ratio of monomer compositions was styrene/acrylic acid/methacrylic acid=74/11/15 (mass ratio), the weight-average molecular weight was 8200, the acid value was 183 mgKOH/g, and the glass transition temperature was 110° C.

Synthesis Example 4

A styrene-acrylic acid copolymer (A-4) was synthesized, in which the ratio of monomer compositions was styrene/acrylic acid/methacrylic acid=77/10/13 (mass ratio), the weight-average molecular weight was 5000, the acid value was 150 mgKOH/g, and the glass transition temperature was 107° C.

Synthesis Example 5

A styrene-acrylic acid copolymer (A-5) was synthesized, in which the ratio of monomer compositions was styrene/acrylic acid/methacrylic acid=77/10/13 (mass ratio), the weight-average molecular weight was 45000, the acid value was 152 mgKOH/g, and the glass transition temperature was 107° C.

Synthesis Example 6

A styrene-acrylic acid copolymer (A-6) was synthesized, in which the ratio of monomer compositions was styrene/methyl methacrylate/acrylic acid/methacrylic acid=50/27/10/13 (mass ratio), the weight-average molecular weight was 12000, the acid value was 149 mgKOH/g, and the glass transition temperature was 106° C.

Synthesis Example 7

A styrene-acrylic acid copolymer (A-7) was synthesized, in which the ratio of monomer compositions was styrene/acrylic acid/methacrylic acid=83/7/10 (mass ratio), the weight-average molecular weight was 8300, the acid value was 120 mgKOH/g, and the glass transition temperature was 105° C.

Synthesis Example 8

A styrene-acrylic acid copolymer (A-8) was synthesized, in which the ratio of monomer compositions was styrene/acrylic acid/methacrylic acid=69/13/18 (mass ratio), the weight-average molecular weight was 8600, the acid value was 219 mgKOH/g, and the glass transition temperature was 111° C.

Embodiment 1

(Preparation of Aqueous Pigment Dispersion)

A methyl ethyl ketone solution (100 g), which contains 50% by mass of the styrene-acrylic acid copolymer (A-1) obtained in Synthesis Example 1 in terms of solid content concentration was added with a mixture solution of commercially-available 1 N KOH aqueous solution (125 mL) and ion-exchanged water (75 mL) while agitating to neutralize the styrene-acrylic acid copolymer (A-1). After removal of methyl ethyl ketone under reduced pressure, ion-exchanged water was added to obtain an aqueous solution (B-1) containing the styrene-acrylic acid copolymer (A-1) having the solid content of 20%.

Then, after the following components were fed into a 250 mL container, a paint conditioner was used to conduct dispersion processing for four hours. After the completion of dispersion processing, 11.5 parts of ion-exchanged water was further added, zirconia beads were filtered and removed to obtain an aqueous pigment dispersion with a pigment concentration of 14.5%.

| | |
|---|---|
| Aqueous solution of the styrene-acrylic acid copolymer (B-1) | 15 parts |
| C.I. Pigment Red 168 (product name, Hostaperm Scarlet GO transp manufactured by Clariant) | 10 parts |
| Diethyleneglycol | 20 parts |
| Ion-exchanged water | 20 parts |
| Zirconia beads (1.25 mm in diameter) | 400 parts |

Embodiment 2

An aqueous pigment dispersion was obtained in the same manner as Embodiment 1, except that the styrene-acrylic acid copolymer (A-2) was used in place of the styrene-acrylic acid copolymer (A-1) of Embodiment 1.

Embodiment 3

The pigment dispersion obtained in Embodiment 1 was further centrifuged by using a centrifuge H-600S (rotor number=I) manufactured by Kokusan Co., Ltd., at 12,800 G for 10 minutes to obtain an aqueous pigment dispersion with a pigment concentration of 12.7%.

Embodiment 4

The pigment dispersion obtained in Embodiment 2 was further centrifuged by using a centrifuge H-600S (rotor number=I) manufactured by Kokusan Co., Ltd., at 12,800 G for 10 minutes to obtain an aqueous pigment dispersion with a pigment concentration of 11.6%.

Embodiment 5

An aqueous pigment dispersion was obtained in the same manner except that 0.5 weight parts of triethanolamine was added in Embodiment 3.

Embodiment 6

An aqueous pigment dispersion was obtained in the same manner except that 1.0 weight part of triethanolamine was added in Embodiment 3.

Embodiment 7

An aqueous pigment dispersion was obtained in the same manner as Embodiment 3 except that the styrene-acrylic acid copolymer (A-3) was used in place of the styrene-acrylic acid copolymer (A-1) of Embodiment 3.

Comparative Examples 1 to 3

An aqueous pigment dispersion was obtained in the same manner as Embodiment 1 except that the styrene-acrylic acid copolymers (A-4 to A-6) were used in place of the styrene-acrylic acid copolymer (A-1) of Embodiment 1.

Comparative Examples 4, 5

An aqueous pigment dispersion was obtained in the same manner as Embodiment 1 except that the styrene-acrylic acid copolymers (A-7, A-8) were used in place of the styrene-acrylic acid copolymer (A-1) of Embodiment 1.

Comparative Example 6

An aqueous pigment dispersion with a pigment concentration of 14.4% was obtained in exactly the same manner as Embodiment 1 except that C. I. Pigment Orange 16 (product name, Symler Fast Orange V manufactured by Dainippon Ink and Chemicals Incorporated) was used in place of the C. I. Pigment Red 168 of Embodiment 1.

Comparative Example 7

An aqueous pigment dispersion with a pigment concentration of 14.7% was obtained in exactly the same manner as Embodiment 1 except that C. I. Pigment Red 166 (product name, Cromophtal Scarlet RI manufactured by Ciba Specialty Chemicals) was used in place of the C. I. Pigment Red 168 of Embodiment 1.

Comparative Example 8

An aqueous pigment dispersion with a pigment concentration of 14.5% was obtained in exactly the same manner as Embodiment 1 except that C. I. Pigment Red 177 (product name, Cromophtal Red A2B manufactured by Ciba Specialty Chemicals) was used in place of the C. I. Pigment Red 168 of Embodiment 1.

Comparative Example 9

An aqueous pigment dispersion with a pigment concentration of 14.4% was obtained in exactly the same manner as Embodiment 1 except that C. I. Pigment Orange 38 (product name, Novoperm Red HFG manufactured by Clariant Japan Co., Ltd.) was used in place of the C. I. Pigment Red 168 of Embodiment 1.

Comparative Example 10

An aqueous pigment dispersion with a pigment concentration of 14.9% was obtained in exactly the same manner as Embodiment 1 except that C. I. Pigment Orange 43 (product name, Hostaperm Orange GR manufactured by Clariant Japan Co., Ltd.) was used in place of the C. I. Pigment Red 168 of Embodiment 1.

Comparative Example 11

An aqueous pigment dispersion with a pigment concentration of 15.0% was obtained in exactly the same manner as Embodiment 1 except that C. I. Pigment Red 242 (product name, Hostaperm Scarlet 4RF manufactured by Clariant Japan Co., Ltd.) was used in place of the C. I. Pigment Red 168 of Embodiment 1.

Table 1 shows the compositions of aqueous pigment dispersions in the embodiments and comparative examples.

TABLE 1

Compositions of aqueous pigment dispersions

| | Resin compositions St/MMA/AA/MA | Acid value | Weight-average molecular weight | Orange pigments used | Quantity of triethanol amine (% by mass with respect to pigment) | With or without centrifugation |
|---|---|---|---|---|---|---|
| Embodiment 1 | 77/0/10/13 | 140 | 7600 | Pigment Red 168 | 0% | Not centrifuged |
| Embodiment 2 | 77/0/10/13 | 151 | 20000 | Pigment Red 168 | 0% | Not centrifuged |
| Embodiment 3 | 77/0/10/13 | 140 | 7600 | Pigment Red 168 | 0% | Centrifuged |
| Embodiment 4 | 77/0/10/13 | 151 | 20000 | Pigment Red 168 | 0% | Centrifuged |
| Embodiment 5 | 77/0/10/13 | 140 | 7600 | Pigment Red 168 | 5% | Centrifuged |
| Embodiment 6 | 77/0/10/13 | 140 | 7600 | Pigment Red 168 | 10% | Centrifuged |
| Embodiment 7 | 74/0/11/15 | 183 | 8200 | Pigment Red 168 | 0% | Centrifuged |
| Comparative example 1 | 77/0/10/13 | 150 | 5000 | Pigment Red 168 | 0% | Not centrifuged |
| Comparative example 2 | 77/0/10/13 | 152 | 45000 | Pigment Red 168 | 0% | Not centrifuged |
| Comparative example 3 | 50/27/10/13 | 149 | 12000 | Pigment Red 168 | 0% | Not centrifuged |
| Comparative example 4 | 83/0/7/10 | 120 | 8300 | Pigment Red 168 | 0% | Not centrifuged |
| Comparative example 5 | 69/0/13/18 | 219 | 8600 | Pigment Red 168 | 0% | Not centrifuged |
| Comparative example 6 | 77/0/10/13 | 140 | 7600 | Pigment Orange 16 | 0% | Not centrifuged |
| Comparative example 7 | 77/0/10/13 | 140 | 7600 | Pigment Red 166 | 0% | Not centrifuged |
| Comparative example 8 | 77/0/10/13 | 140 | 7600 | Pigment Red 177 | 0% | Not centrifuged |
| Comparative example 9 | 77/0/10/13 | 140 | 7600 | Pigment Orange 38 | 0% | Not centrifuged |
| Comparative example 10 | 77/0/10/13 | 140 | 7600 | Pigment Orange 43 | 0% | Not centrifuged |
| Comparative example 11 | 77/0/10/13 | 140 | 7600 | Pigment Red 242 | 0% | Not centrifuged |

Aqueous pigment dispersions prepared in Embodiments 1 to 7 and Comparative Examples 1 to 11 were evaluated for the following items.

<Quantitative Determination of Coarse Particles>

Each of the aqueous pigment dispersions obtained in the above-described embodiments and comparative examples was diluted to 100 times with ion-exchanged water to determine the concentration of coarse particles exceeding 1 μm or greater by using an Accusizer 780 APS manufactured by Particle Sizing Systems. It is noted that this concentration is based on the aqueous pigment dispersions before dilution. Table 2 shows the results.

<Evaluation of Dispersibility>

Aqueous pigment dispersions obtained in these embodiments and comparative examples were measured for particle size and viscosity. It is noted that the particle size was measured by using "Micro-track UPA150" (manufactured by Leeds & Northrup), with the volume average particle size being taken as the particle size of an aqueous dispersion. The viscosity was measured at 25° C. by using an E-type viscometer (TVE-20L, TOKIMEC INC. Table 2 shows the results.

<Evaluation of Appropriateness of Ink for Inkjet Recording (1) (Jettability)>

Each of the aqueous pigment dispersions obtained in the above embodiments and comparative examples was used to prepare ink for inkjet recording on the basis of the following compositions.

| | |
|---|---|
| Aqueous pigment dispersion | 5.52 parts |
| 2-pyrrolidinone | 1.60 parts |
| Triethyleneglycol monobutyl ether | 1.60 parts |
| Saphinol 440 (Nissin Chemical Industry Co., Ltd.) | 0.10 parts |
| Glycerin | 0.60 parts |
| Ion-exchanged water | 10.58 parts |

The thus prepared ink was filtered through a membrane filter having a pore size of 5 μm, and thereafter mounted on an inkjet printer "nova Jet) PRO36" (manufactured by ENCAD). Then, evaluation was made for appropriateness of the inkjet recording, in other words, 80% area range of A0 size paper was subjected to continuous printing at 100% image concentrations to evaluate the ink jettabilitiesy before and after printing. Table 2 shows the results.

Evaluation Criteria for Jettability:
A: No defective discharging was found.
B: Abnormal direction of ink discharging was found after continuous printing, but unevenness in printing concentration was not found.
C: Unevenness in printing concentration was found after continuous printing, and the printing concentration was remarkably decreased.

<Evaluation of Appropriateness of Ink for Inkjet Recording (2) (Light Fastness/gloss)>

Ink prepared in Evaluation of appropriateness of ink for inkjet recording (1) was mounted at the position of a black cartridge of an inkjet printer EM-930C (manufactured by EPSON), and a recording medium (Premium Glossy Photo Paper, manufactured by EPSON) was used to record at 100% image concentrations. The color saturation of the thus obtained image was measured by using "SpetroScan" (manufactured by Gretag Macbeth). Further, recording was made at 95% image concentration, and the thus obtained image was measured for gloss at an angle of 20° by using "micro-TRI-gloss" (manufactured by BYK-Gardner). The gloss value is a value that is obtained at 95% image concentration.

Further, the light fastness of the above image was determined with reference to $\Delta E$ values obtained by using the spectrum-scanning on the basis of deteriorated images after 48-hour exposure to light of 765 W/m$^2$ from a xenon arc lamp.

Evaluation for Light Fastness:
A: $\Delta E$ is 4 or lower and the light fastness is favorable.
B: $\Delta E$ is 4 or more and less than 7.
C: $\Delta E$ is 7 or more.

Table 2 shows the results.

<Evaluation of Stability>

Ink prepared in Evaluation of appropriateness of ink for inkjet recording (1) was allowed to stand at 70° C. for four weeks. Then, the particle size and viscosity before and after the ink was allowed to stand and the occurrence of coagulated substances after the ink was allowed to stand were checked. The particle size before and after being allowed to stand, the variation in viscosity and the presence or absence of occurrence of coagulated substances were used as an index of stability to make an evaluation. The particle size and the viscosity were measured by the same device and the same method used in evaluating the dispersibility. Table 2 shows the results.

TABLE 2

| | Dispersion property of aqueous pigment dispersions | | | Storage stability of ink for inkjet recording | | | Jet characteristics/image quality | | |
|---|---|---|---|---|---|---|---|---|---|
| | Coarse particles (10$^7$ particles/mL) | Particle size of dispersion (nm) | Viscosity of dispersion (mPa·s) | Change in particle size after heating (%) | Change in viscosity after heating (%) | Presence or absence of coagulated substances after heating | Jettability | Heat resistance | Gloss |
| Embodiment 1 | 2.51 | 125 | 4.1 | 4 | 2 | Absent | A | A | 82 |
| Embodiment 2 | 2.35 | 129 | 4.9 | 7 | 4 | Absent | A | A | 76 |
| Embodiment 3 | 0.04 | 124 | 4.2 | 6 | 3 | Absent | A | A | 86 |
| Embodiment 4 | 0.01 | 122 | 4 | 5 | 3 | Absent | A | A | 89 |
| Embodiment 5 | 0.03 | 91 | 4.4 | 5 | 4 | Absent | A | A | 95 |
| Embodiment 6 | 0.05 | 88 | 4.8 | 7 | 4 | Absent | A | A | 97 |
| Embodiment 7 | 0.02 | 92 | 4.6 | 2 | 2 | Absent | A | A | 112 |
| Comparative Example 1 | 3.56 | 95 | 3.4 | 11 | 10 | Absent | B | A | 46 |
| Comparative Example 2 | 4.26 | 140 | 4.7 | 35 | 120 | Absent | B | A | 33 |
| Comparative Example 3 | 9.86 | 174 | 4.5 | 41 | 25 | Absent | C | A | 24 |
| Comparative Example 4 | 35.63 | 160 | 7.5 | 34 | 23 | Absent | C | A | 38 |
| Comparative Example 5 | 42.35 | 129 | 9.6 | 45 | 14 | Absent | C | A | 45 |
| Comparative Example 6 | 9.56 | 84 | 4.7 | 4 | 2 | Absent | A | C | 166 |
| Comparative Example 7 | 9.96 | 156 | 4.3 | 278 | 60 | Present | C | C | 43 |
| Comparative Example 8 | 1.05 | 102 | 4.4 | 67 | 22 | Absent | A | B | 53 |
| Comparative Example 9 | 6.52 | 260 | 3.2 | 570 | 45 | Absent | A | A | 10 |
| Comparative Example 10 | 23.25 | 206 | 3.3 | 25 | 67 | Absent | A | A | 49 |
| Comparative Example 11 | 85.33 | 430 | 3.5 | 689 | 78 | Present | C | A | 28 |

As is evident from Embodiments 1 to 7 given in Table 2, the aqueous pigment dispersions of the present invention provide excellent dispersibility and storage stability by combining Pigment Red 168 and a styrene-acrylic acid copolymer which contains 60% by mass or more of styrene-based monomer units with respect to total monomer components and has an acid value of 130 to 200 and a weight-average molecular weight of 6000 to 40000. Coarse particles, which are not crushed through dispersion by a paint shaker, are greatly reduced by centrifugation, as illustrated in Embodiments 3 and 4, thereby making it possible to increase the gloss. Further, as given in Embodiments 5 and 6, it is found that addition of triethanolamine when dispersing makes it possible to decrease the volume average particle size of a pigment dispersion and also increase the gloss value. As given in Embodiment 7, it is also found that the acid value is adjusted to approximately 180, thereby making it possible to provide similar or better effects as with the addition of triethanolamine, although it is not actually added.

On the other hand, in Comparative Example 1 where the styrene-acrylic acid copolymer is less than 6000 in weight-average molecular weight, the dispersion is reduced in particle size but the storage stability is slightly decreased, and the jettability is also decreased. Therefore, when the recording is made at 95% image concentration, the gloss is decreased. Further, in Comparative Example 2 where the styrene-acrylic acid copolymer exceeds 40000 in the weight-average molecular weight, coarse particles are increased in number, the pigment dispersion is increased in volume average particle size, storage stability is deteriorated, and in particular, the viscosity is significantly increased. Further, in Comparative Example 3 where styrene-based monomer units of styrene acrylic acid-based copolymer are less than 60% by mass, the volume average particle size is increased after dispersion, the storage stability is also decreased, and in particular, the jettability is excessively decreased. Still further, in Comparative Examples 4 and 5 where the acid value of the styrene-acrylic acid copolymer is out of an appropriate range of 130 to 200, coarse particles are increased rapidly to seriously deteriorate the rate of change in particle size after heating and in viscosity. As a result, it is found that the gloss is decreased to result in a failure of providing more favorable jettability.

In addition, in Comparative Examples 6 to Comparative Examples 11 where orange pigments other than the Pigment Red 168 are used, they are inferior to the Pigment Red 168 when a comprehensive consideration is given to the volume average particle size, the storage stability, the gloss, the jettability and others after dispersion. This result is greatly inferior to the results of the embodiments particularly in terms of the storage stability. The pigment red 16 used in Comparative Example 6 is only excellent in storage stability, jettability and having a small volume average particle size after dispersion. However, it is poor in light fastness and not acceptable in use as an ink composition for inkjet recording.

As described so far, ink for inkjet recording mainly composed of an aqueous pigment dispersion combined with the Pigment Red 168 and the specified styrene-acrylic acid copolymer is not only long in storage stability but also high in gloss, excellent in light fastness, in addition to long storage stability, favorable in jettability and applicable for inkjet recording. On the other hand, ink for inkjet recording in which the pigment orange 16 is used is good in storage stability and gloss but inferior in light fastness. Further, some inks for inkjet recording in which other orange pigments are used are good in volume average particle size after dispersion but inferior in storage stability and gloss to embodiments in which the Pigment Red 168 is used.

Hereinafter, a description of embodiments is given for a method for producing an aqueous pigment dispersion having a kneading step.

Embodiment 8

| (Preparation of aqueous pigment dispersion) | |
|---|---|
| Styrene-acrylic acid copolymer (A-3) | 150 parts |
| Pigment Red 168 | 600 parts |
| (Hostaperm Scarlet GO transp manufactured by Clariant Japan Co., Ltd.) | |
| 8N-potassium hydroxide aqueous solution80. | 3 parts |
| Diethyleneglycol | 150 parts |

A mixture having the above compositions was prepared, fed into a 50 L-capacity planetary mixer kept at 60° C. (PLM-V-50V, manufactured by Inoue Manufacturing Co., Ltd.) and kneaded at a rotation of 59 rmm and a revolution of 22 rpm. Thirty minutes later, the mixture was lumped together, formed into a bar shape, and further kneaded for 240 minutes. During the kneading, 40 parts of diethyleneglycol was added four times separately. During kneading for 240 minutes, electricity was consumed at 5 to 12 amperes, which was repeatedly increased or decreased depending on the rotational period of agitation blades. This is because the mixture is a semi-solid with an extremely high viscosity, therefore, not distributed evenly inside the container, and a great force is applied thereto every time when the agitation blades periodically shear the mixture.

After 240 minutes elapsed, as red down operation, water (1200 parts) was added to obtain a uniform mixture with a pigment concentration of 28.2% by mass.

The thus obtained mixture was transferred to a stainless-steel drum, ion-exchanged water (738 parts) and diethyleneglycol (240 parts) were added and uniformly mixed by using an agitator motor, the resultant was transferred to a bead mill (nano mill NM-G-2L, manufactured by Asada Tekko Co., Ltd.) and subjected to dispersion at 25° C. for a 2.5-minute dwelling time to obtain a pigment dispersion.

Then, the dispersion was transferred to a continuous-type centrifuge (H-600S, 2 L capacity, manufactured by Kokusan Co., Ltd.), continuously subjected to centrifugation at a centrifugal force of 18900 G at 35° C. for a 10-minute dwelling time to obtain an aqueous pigment dispersion with a pigment concentration of 14.7%.

Embodiment 9

In Embodiment 8, a mixture to be fed into the planetary mixer was composed of the following:

| | |
|---|---|
| Styrene-acrylic acid copolymer (A-3) | 150 parts |
| Pigment Red 168 | 600 parts |
| (Hostaperm Scarlet GO transp manufactured by Clariant Japan Co., Ltd.) | |
| 8N-potassium hydroxide aqueous solution | 80.3 parts |
| Diethyleneglycol | 120 parts |
| Triethanolamine | 18 parts |

Further, an aqueous pigment dispersion with a pigment concentration of 16.9% was obtained in the same manner Embodiment 8 except that diethyleneglycol to be added into during kneading was 5 parts.

Table 3 shows compositions of the aqueous pigment dispersion produced by the production method having the kneading step.

TABLE 3

Compositions of aqueous pigment dispersions

| | Resin compositions St/MMA/AA/MA | Acid value | Weight-average molecular weight | Orange pigments used | Quantity of triethanol amine (% by mass with respect to pigment) | With or without centrifugation |
|---|---|---|---|---|---|---|
| Embodiment 8 | 74/0/11/15 | 183 | 8200 | Pigment Red 168 | 0% | Centrifuged |
| Embodiment 9 | 74/0/11/15 | 183 | 8200 | Pigment Red 168 | 3% | Centrifuged |

The aqueous pigment dispersion of Embodiment 8 and Embodiment 9 obtained by the production method with the kneading step were determined quantitatively for coarse particles by the same method as that used in the aqueous pigment dispersions obtained in Embodiment 1 to Embodiment 7 and Comparative Example 1 to Comparative Example 11 and also measured for the particle size of pigment dispersion and the viscosity thereof to evaluate the dispersibility.

Further, ink for inkjet recording was prepared similar as in Embodiment 1 to Embodiment 7 and Comparative Example 1 to Comparative Example 11, which was measured for changes in particle size and a viscosity before and after heating of the ink to evaluate the storage stability. Still further, the ink was printed by using the same inkjet printer as that used in Embodiment 1 to Embodiment 7 and Comparative Example 1 to Comparative Example 11 to evaluate the jettability and the light fastness. Table 4 shows the results.

TABLE 4

| | Dispersion property of aqueous pigment dispersions | | | Storage stability of ink for inkjet recording | | | Jet characteristics/ image quality | |
|---|---|---|---|---|---|---|---|---|
| | Coarse particles (107 particles/mL) | Particle size of dispersion (nm) | viscosity of dispersion (mPa · s) | Change in particle size after heating (%) | Change in viscosity after heating (%) | Presence or absence of coagulated substances after heating | Jettability | Light resistance |
| Embodiment 8 | 0.01 | 121 | 3.8 | 4 | 2 | Absent | A | A |
| Embodiment 9 | 0.01 | 114 | 4.5 | 2 | 1 | Absent | A | A |

As apparent from Table 4, aqueous pigment dispersions of Embodiment 8 and Embodiment 9 produced through the kneading step and ink for inkjet recording containing the aqueous dispersions as a main component have characteristics better than those of the aqueous pigment dispersions and the ink for inkjet recording in Embodiment 1 to Embodiment 7. They are superior in the small quantity of coarse particles and storage stability. In Embodiment 1 to Embodiment 7, the ratio of the styrene-acrylic acid copolymer to pigment is 30 to 100, whereas in Embodiment 8 and Embodiment 9, the ratio is 25 to 100. It is apparent that aqueous pigment dispersions high in stability can be prepared by using a smaller quantity of styrene-acrylic acid copolymer. In other words, this fact means nothing more than that the copolymer swollen by the kneading step is pressed on the surface of the Pigment Red 168, thereby allowing for effective coverage on the surface of the pigment.

As described above, the Pigment Red 168 can be dispersed stably by adding a smaller quantity of the styrene-acrylic acid copolymer, thereby further reducing the quantity of the styrene-acrylic acid copolymer dissolved in an aqueous pigment dispersion and ink for inkjet recording. It is, therefore, possible to attain favorable storage stability at high temperatures.

The invention claimed is:

1. An aqueous pigment dispersion which comprises (a) an orange pigment, (b) a styrene-acrylic acid copolymer, (c) an alkali metal hydroxide and (d) a wetting agent, wherein (a) the orange pigment is C. I. Pigment Red 168, and (b) the styrene-acrylic acid copolymer has 60% by mass or more of styrene-based monomer units, an acid value of 130 to 200 and a weight-average molecular weight of 7,500 to 30,000.

2. The aqueous pigment dispersion according to claim 1, further comprising (e) a dispersion assistant agent, wherein the dispersion assistant agent is triethanolamine.

3. The aqueous pigment dispersion according to claim 1, wherein (c) the alkali metal hydroxide is added in a quantity corresponding to the neutralization rate of 80 to 120% with respect to (b) the styrene-acrylic acid copolymer.

4. The aqueous pigment dispersion according to claim 2, wherein (e) the dispersion assistant agent is added at 1 to 10% by mass with respect to the C. I. Pigment Red 168.

5. The aqueous pigment dispersion according to claim 1, wherein (b) the styrene-acrylic acid copolymer has the sum of 95% by mass or more of styrene-based monomer units, acrylic acid monomer units and methacrylic acid monomer units.

6. An ink composition for inkjet recording which comprises the aqueous pigment dispersion according to any one of claim 1 to claim 5 as a major component.

7. A method for producing an aqueous pigment dispersion which comprises a step of dispersing a mixture that comprises (a) an orange pigment, (b) a styrene-acrylic acid copolymer, (c) an alkali metal hydroxide, (d) a wetting agent and (f) water, wherein (a) the orange pigment is C. I. Pigment Red 168, (b) the styrene-acrylic acid copolymer has 60% by mass or more of styrene-based monomer units, an acid value of 130 to 200, and a weight-average molecular weight of 7,500 to 30,000.

8. The method for producing an aqueous pigment dispersion according to claim 7, wherein in the step of dispersing the mixture, the mixture further comprises (e) a dispersion assistant agent and the dispersion assistant agent is triethanolamine.

9. The method for producing an aqueous pigment dispersion according to claim 7 or claim 8 comprising steps of: kneading the mixture containing (a) the orange pigment, (b) the styrene-acrylic acid copolymer, (e) the alkali metal hydroxide and (d) the wetting agent to produce a solid colored and kneaded substance and dispersing the solid colored and kneaded substance into an aqueous medium.

10. The method for producing an aqueous pigment dispersion according to claim 9, wherein the mixture prepared in the kneading step further comprises (e) a dispersion assistant agent and the dispersion assistant agent is triethanolamine.

11. The method for producing an aqueous pigment dispersion according to claim 10, wherein the styrene-acrylic acid copolymer is a solid.

12. The ink composition for inkjet recording according to claim 6, wherein the ink composition for inkjet recording is used in inkjet recording based on a thermal jet system.

* * * * *